Figure 1:
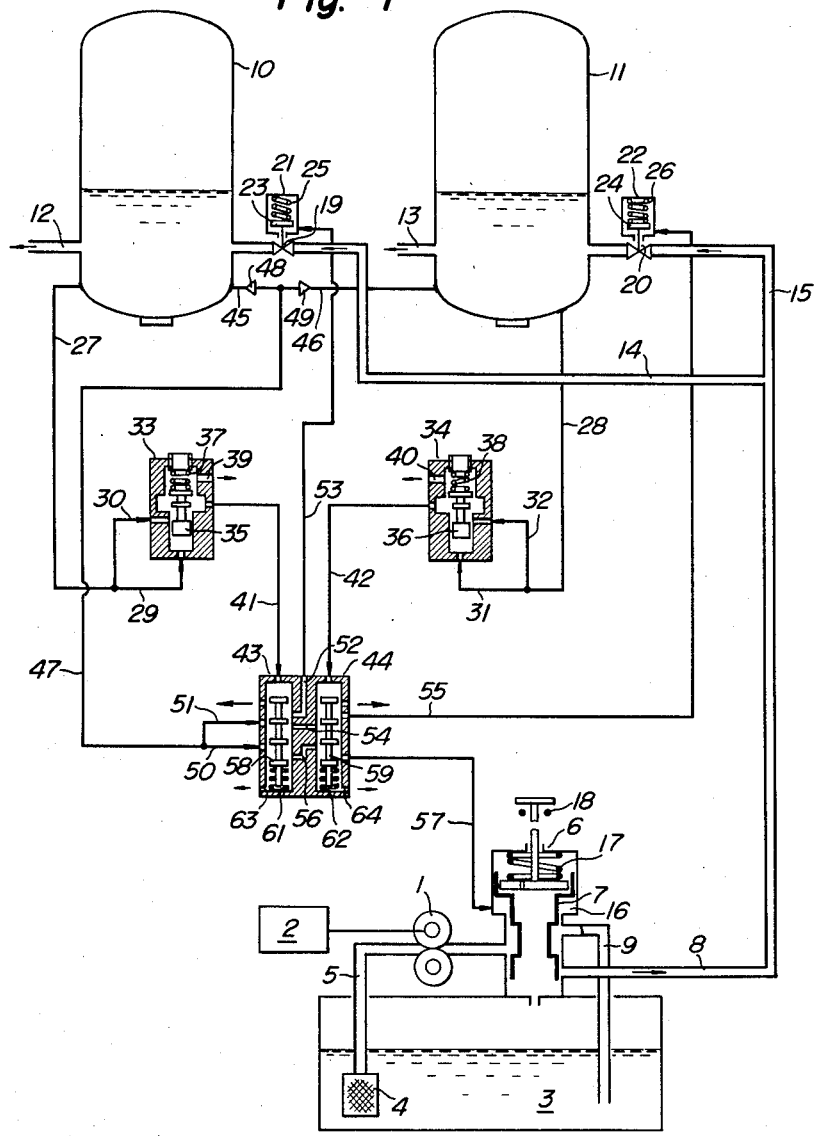

Sept. 1, 1964 HARUO ISHIKAWA 3,146,786
OPERATING SYSTEM FOR PRESSURIZED OIL APPARATUS
Filed July 1, 1963 2 Sheets-Sheet 1

INVENTOR
HARUO ISHIKAWA
BY Paul M. Craig, Jr.
ATTORNEY

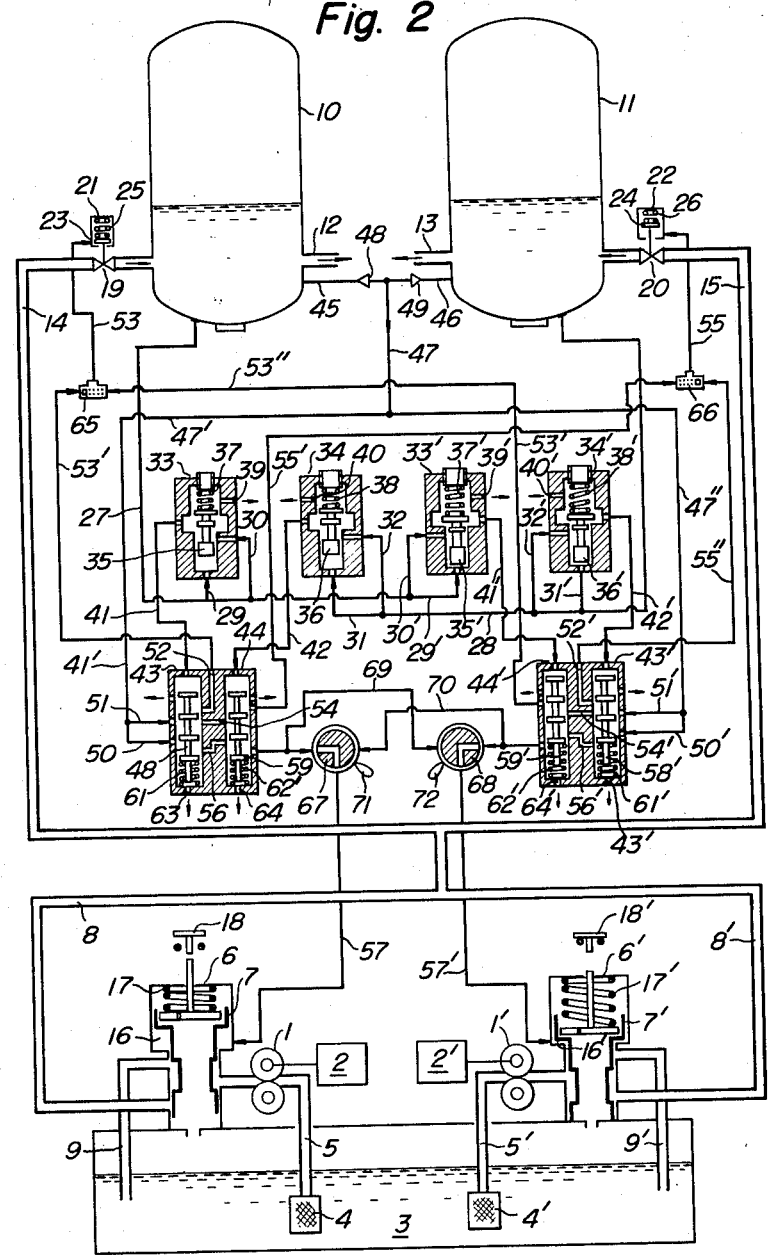

United States Patent Office 3,146,786
Patented Sept. 1, 1964

3,146,786
OPERATING SYSTEM FOR PRESSURIZED
OIL APPARATUS
Haruo Ishikawa, Hitachi-shi, Japan, assignor to Hitachi,
Ltd., Tokyo, Japan, a corporation of Japan
Filed July 1, 1963, Ser. No. 291,955
Claims priority, application Japan July 3, 1962
3 Claims. (Cl. 137—108)

The present invention relates to apparatus for maintaining a predetermined oil pressure in pressurized oil accumulators each serving as a pressurized oil source in separate pressurized oil systems, and more particularly to an operating system for such pressurized oil apparatus.

In hydraulic power stations, for instance, wherein a plurality of water wheels are arranged in juxtaposed relationship, a commonly employed arrangement for distributing pressurized oil required for speed regulation, lubrication valve control and the like for the normal operation of such water wheels is such that one pressurized oil accumulator is provided for each of the water wheels and all the accumulators are supplied with pressurized oil by one or two pumps, instead of providing a pressurized oil pump for each water wheel for direct supply thereto. This type of arrangement is called a centralized pressurized oil apparatus, and has such an advantage as reduced installational cost as compared with apparatus of a decentralized type wherein a pump is provided for each water wheel.

However, the centralized pressurized oil apparatus of this type of conventional design have been unsatisfactory in respect of maintenance in that respective pressurized oil accumulators are interconnected with each other so that each accumulator takes a same oil level.

Or more precisely, although such conventional arrangement has been advantageous in substantially increasing the capacity of pressurized oil accumulators and reducing the number of start-stop of pumps, failure in one of the pressurized oil accumulators or the associated pressurized oil system has usually resulted in a situation that, in an extreme case, all of the rest of the water wheels must be stopped and the defective portion must be repaired. Even not so serious, trouble with failure developed in a part of the pressurized oil system will be remarkably great in the arrangement of such kind.

It is therefore the primary object of the present invention to provide a pressurized oil apparatus wherein each of pressurized oil accumulators is made as a unit element independent of other accumulators in respective pressurized oil systems so that, even when any one of such unit elements may partly develop a failure, the other unit elements are free to continue normal operations without being affected by the defective unit element.

It is another object of the present invention to provide an operating system for the pressurized oil apparatus whereby the pressurized oil systems including the pressurized oil accumulators each being independent as a unit element are automatically and accurately controlled for maintaining a predetermined oil pressure.

In the operating system for the centralized pressurized oil apparatus of the kind described above, two pumps including one stand-by pump are usually provided for the reason of facilitating the maintenance of the pumps and also in consideration of any failure in the working pump. One of the pumps is placed in normal steady operation, while the other is reserved for use when it is desired to stop the working pump or in the event of an inoperative state of such pump. With regard to these pumps, the former is commonly called a preceding pump, and the latter, a succeeding pump. Inasmuch as such pump arrangement is generally practised, the present invention also has for its object to provide unobstructed control of the operation in a pressurized oil apparatus comprising two pumps.

These and other objects as well as technical constitution of the present invention to meet such objects will become obvious from the following description of preferred embodiments of the invention with reference to the accompanying drawings, in which:

FIG. 1 is a diagrammatic arrangement of an embodiment of the invention wherein one pump supplies pressurized oil to two pressurized oil accumulators; and FIG. 2 is also a diagrammatic arrangement of another embodiment showing the provision of two pumps.

Now referring to FIG. 1, the pressurized oil apparatus of the invention includes a rotary pump 1 such as a gear pump which is driven by an electric motor 2. The gear pump 1 draws oil from an oil reservoir 3 through a filter 4 by way of a conduit 5 and supplies to an unloader 6. The unloader 6 comprises thereinside a valve member 7 actuated by pressurized oil and distributes the pressurized oil supplied by the gear pump 1 to a conduit 8 or 9. The conduit 8 is branched into two conduits 14 and 15 which communicate with pressurized oil accumulators 10 and 11, respectively. It will be seen that the pressurized oil apparatus of the present embodiment is thus provided with two pressurized oil accumulators. The pressurized oil accumulators 10 and 11 communicate with respective pressurized oil systems through conduits 12 and 13, respectively, for supply of pressurized oil thereto. The conduit 9 constitutes a pressurized oil discharge line to the oil reservoir 3.

Referring to the unloader 6, it further includes a cylinder 16 for receiving therein pressurized oil for actuating the valve member 7, a helical spring 17 disposed in the cylinder 16 so as to oppose the valve member 7, and a starting switch 18 for the electric motor 3. The valve member 7 is always urged downwardly by means of the spring 17 so that the pressurized oil discharged from the gear pump 1 is ordinarily in communication with the conduit 8, however this situation is varied by the supply of pressurized oil into the pressurized oil cylinder 16 as will be explained in detail in later description.

Valves 19 and 20 are provided on the conduits 14 and 15 upstream of the accumulators 10 and 11, respectively, to control the flow of pressurized oil therethrough. The valves 19 and 20 are of piston-operated type, wherein valve members are formed integrally with pistons 23 and 24 disposed within pressurized oil cylinders 21 and 22, respectively. Opening of the valves 19 and 20 is effected by the introduction of pressurized oil into respective cylinders to thereby urge the pistons upwardly, while closure thereof is made by springs 25 and 26 fitted in the cylinders 21 and 22, respectively, in opposition to pressurized oil spaces in such cylinders for exerting a downwardly directed force thereagainst.

The valves 19 and 20 provided on said conduits 14 and 15, respectively, and the unloader 6 as well as the motor 2 for driving the pump 1 are controlled by the following operating system. The operating system includes pressurized oil conduits 27 and 28 which are led from the bottom portions of respective pressurized oil accumulators and branched into conduits 29 and 30, and 31 and 32 led to control valves 33 and 34, respectively. The conduits 29 and 31 supply pressurized oil for actuating valve members 35 and 36 of the respective control valves.

The control valves 33 and 34 are of the same type wherein the spool valve members 35 and 36 are urged downwardly by means of springs 37 and 38 disposed in opposition thereto, respectively, lower spaces thereby defined being in communication with the respective conduits 29 and 31, for receiving therein pressurized oil for actuating the valve members. Pressures of oil in the respective pressurized oil accumulators are detected by the control valves by way of the conduits 29, 30, 31 and 32 led from the bottom portions thereof. Namely, the pressurized oil which energizes the valve members 35 and 36 in the control valves 33 and 34, respectively, corresponds to the condition existing in the respective accumulators.

When a predetermined pressure is maintained in the accumulators, the valve members 35 and 36 in the control valves 33 and 34 are urged upwardly by the pressure to thereby permit free flow through the conduits 30 and 32, which are however closed by the reduction in the pressure in the conduits 29 and 31, respectively. Oil drain ports 39 and 40 serve to drain the pressurized oil existing downstream of the respective control valves when the valve members thereof shut off the conduits 30 and 32.

The conduits 30 and 32 act to supply pressurized oil for operating valve members 58 and 59 of distributing valves 43 and 44 through conduits 41 and 42, respectively. From the bottom portions of the pressurized oil accumulators 10 and 11, conduits 45 and 46 are led through check valves 48 and 49, respectively, to join into a conduit 47 which is then branched into conduits 50 and 51 that are connected to respective inlets of one of the distributing valves, said check valves 48 and 49 being effective to prevent the counterflow towards the respective accumulators. The distributing valves 43 and 44 of a unitary structure thus receive pressurized oil supply from the accumulators 10 and 11 through the conduit 47 and serve to divert or shut off the oil to the operating cylinders 21 and 22 of the supply valves provided on the conduits 14 and 15, respectively, and to the operating oil cylinder 16 of the unloader 6. Said distributing valves also serve the purpose of draining the pressurized oil existing in said oil cylinders 21, 22 and 16, as will be described in more detail hereinunder.

Or more precisely, the conduit 50 communicates across the distributing valves with a conduit 57 leading to the oil cylinder 16 of the unloader 6. The conduit 51 communicates across the distributing valves with conduits 53 and 55 leading to the oil cylinders 21 and 22 of the supply valves 19 and 20, respectively. To this end, the distributing valves 43 and 44 have respective valve members 58 and 59 arranged in series with respect to the oil inlet ports in the valves which communicate with the conduits 50 and 51. An oil passage 52 provided in the unitary construction of the two valves provides communication between said conduit 51 and the conduit 53 led to the oil cylinder 21 of the supply valve 19. An oil passage 54 communicates through the distributing valve 44 with the conduit 55 led to the oil cylinder 22 of the supply valve 20. An oil port 56 provides communication between said conduit 50 and the conduit 57 led to the oil cylinder 16 of the unloader 6.

The spool valve members 58 and 59 are each formed with four enlarged portions or heads and urged upwardly by springs 61 and 62, respectively. The conduits 41 and 42 are made to open at the upper spaces of the valves to exert downwardly directed operating oil pressure against the respective valve members so that communication and disconnection of the oil conduits can suitably be made as desired by the relative pressure of the oil against the upwardly directed force by the springs 61 and 62. Oil drain ports 63 and 64 are provided at the lower portions of the valves 43 and 44, respectively, so as to drain the pressurized oil within the operating oil cylinder 16 of the unloader 6 and the associated conduit 57 when any one of the valve members 58 and 59 is urged upwardly.

The apparatus of this embodiment with the foregoing arrangement operates as follows: Assuming, for instance, that the oil pressure in the pressurized oil accumulator 10 goes down below a predetermined value. In such a case, the oil pressure at the lower portion of the accumulator 10 decreases accordingly and this will appear as pressure reduction in the conduit 29. Then, the valve member 35 of the control valve 33 is urged downwardly by the force of the spring 37 and finally shuts off the communication between the conduits 30 and 41 with its enlarged port or head provided at the intermediate portion thereof. The pressurized oil within the conduit 41 and the upper space of the distributing valve 43 is thereby drained through the oil port 39. Consequently, the valve member 58 of the distributing valve 43 is urged upwardly by the action of the spring 61 to communicate the conduit 51 with the oil port 52, and at the same time shut off the communication between the conduit 50 and the oil port 56. Thus the conduit 51 is made to communicate with the conduit 53 for supplying the operating oil into the oil cylinder of the supply valve 21. Therefore, the piston 23 therein is forced upwardly to open the valve 21. The pressure distributing valve 43 also acts to drain the pressurized oil within the conduit 57 and the oil cylinder 16 from the oil port 63. As soon as the pressurized oil has been drained out of the oil cylinder 16, the spring 17 resiliently presses the valve member 7 of the unloader 6 to cause the downward movement of such valve member. The downward movement of the valve member 7 will close the switch 18 for starting the motor 2, which in turn drives the pump 1, and at the same time will communicate the discharge port of the pump 1 with the conduit 8. Since the valve 19 is open by the preceding operation, pressurized oil discharged from the pump 1 is supplied to the pressurized oil accumulator 10 through the conduits 8 and 14. This operation will be continued until the pressure within the accumulator 10 is increased up to the predetermined value.

A conventional manner of control is such that the pressurized oil pump 1 is placed in continuous run, and supply or discharge of the pressurized oil is handled by the unloader, but, according to the invention, the provision of such starting switch 18 makes possible the automatic start-stop of the pump. In this case, the unloader is effective to permit the pump starting at no load.

It will be readily understood that, with regard to the case of pressure reduction in the pressurized oil accumulator 11 or both accumulators 10 and 11, the operation is quite analogous to the case just mentioned and any further explanation thereon will be omitted.

Referring to another preferred embodiment of the invention shown in FIG. 2, there are provided two pumps, or a preceding pump and a succeeding pump. It will be seen that such pump arrangement is more common in oil systems. Such arrangement will be advantageous in that the pressurized oil systems may not be adversely affected by the failure in one of the pumps as the other pump or the succeeding pump can immediately be started to back up the defective one.

In FIG. 2, one pump is provided for each of the pressurized oil apparatus of FIG. 1, and like reference numerals are used throughout to designate like parts corresponding to those of FIG. 1. For one set of the apparatus which is added by the provision of the two pumps, dashes are put on the numerals for ease of distinction and explanation.

Conduits 53' and 53", and 55' and 55" led from distributing valves 43 and 44', and 44 and 43' for communication with oil cylinders of supply valves in conduits 14 and 15 are joined together by T-type check valves 65 and 66 to form conduits 53 and 55, respectively. As known in the art, these T-type check valves are effective to permit the flow of higher pressure oil only of the two conduits which join thereat.

Control valves 33, 34, 33' and 34' have screw members which are in threaded engagement with the respective upper threaded ports in the valves and are in forcedly abutting relationship with springs 37, 38, 37' and 38', respectively. Therefore, by suitably manipulating the screw members toward and away from the springs, operating pressure of valve members 35, 36, 35' and 36' can be adequately adjusted. This adjustment will permit the optional determination of the control valves assigned for the preceding or succeeding operation. When, for example, it is desired to use the control valves 33 and 34 for the preceding operation and the control valves 33' and 34' for the succeeding operation, the springs on the succeeding side may merely be slackened to render the resiliency thereof smaller. Thus, with the reduction of pressure in the pressurized oil accumulators, the preceding control valves operate first and the succeeding valves would not operate until the pressure decreases further.

When the preceding control valves only are actuated, operating oil for the oil cylinders of the valves 19 and 20 is supplied from the preceding side. In this case, the T-type check valves 65 and 66 act in such a manner that no counterflow into the conduits of the succeeding side takes place.

Three-way valves 67 and 68 are provided in conduits led from the distributing valves to oil cylinders of unloaders 6 and 6', respectively. The purpose of these three-way valves is to determine which pump is to be assigned for the preceding or succeeding operation. To this end, communication conduits 69 and 70 are provided to interconnect the conduits associated with the three-way valves 67 and 68 by means of simple manipulation of respective handles 71 and 72.

Assuming, for example, that the three-way valves are placed in the condition as shown in the drawing with the control valves 33' and 34' set at the preceding operation and the valves 33 and 34 set at the succeeding operation. Then when the pressure in the pressurized oil accumulator 10 falls down below a predetermined value, namely, to an extent that oil should be replenished by the pump, the following operation will be carried out. Although, according to FIG. 2, valve members of the preceding control valves 33' and 34' are shown as located at a position corresponding to the pressure reduction in both of the accumulators 10 and 11, it should be borne in mind that the valve member 36' of the control valve 34' takes the position same as that of the control valve 34 irrespective of the illustration in the drawing since the description is specifically directed to the case wherein the pressure within the accumulator 10 alone is assumed to be reduced below the predetermined value. In other words, the valve member of the control valve 33' alone takes the position as shown in the drawing due to the reduced pressure in the conduit 29' and the larger resilient force of the spring 37' than the spring 37. Thus, not only a conduit 30' is no more in communication with a conduit 41', but also pressurized oil in the conduit 41' and in the upper space of the distributing valve 44' is drained through an oil port 39' of the control valve 33', resulting in the upward movement of a valve member 59' of the distributing valve 44' by the action of a spring 62' as illustrated in FIG. 2.

This movement of the valve member 59' will permit the flow of pressurized oil from a conduit 51' to the oil cylinder 21 through an oil port 54' of the distributing valve 44', the conduit 53', the T-type check valve 65 and the conduit 53, to thereby urge the piston 23 to operate the valve 19. At the same time, pressurized oil in the line from the distributing valve to the unloader 6', or the oil within the conduit 57' and the oil cylinder 16' is drained through an oil port 64' by the upward movement of the valve member 59' to urge downwardly a valve member 7' of the unloader 6'. This movement of the valve member 7' will close a switch 18' for starting a motor 2' to run the pump 1' and at the same time provide communication between the pump discharge and a conduit 8' for supply of pressurized oil to the accumulator 10 through the valve 21 which is now open.

It will also be easily understood that the preceding and succeeding relationship of the pumps 1' and 1 can be readily reversed by changing over the three-way valves 67 and 68 from the situation as illustrated to a new situation wherein the conduits 70 and 57, and the conduits 69 and 57' are connected, respectively.

It will be seen that, with the arrangement of this invention, determination of the preceding and the succeeding pumps between the two can be made at will and change-over therebetween can be readily made likewise. One of the drawbacks in the prior art arrangement resides in the fact that the preceding pump and the succeeding pump are arranged in fixed relationship and the succeeding pump is placed under normal continuous operation, resulting in the shorter life. Such drawback can however be obviated by the arrangement of the invention wherein the preceding and the succeeding pumps are suitably changed over during the operation, thus assuring unbiased use of the two pumps.

From the foregoing, it will be known that two preferred embodiments of the invention have been described and illustrated. Briefly, the present invention relates to centralized pressurized oil feeding apparatus, and provides, an automatically operable apparatus which comprises a group of pressurized oil conduits disposed between a pump and each pressurized oil accumulator, said group of pressurized oil conduits being controlled independently of the other, for the purpose of maintaining the pressure in each pressurized oil accumulator at a predetermined value at all times. It will be evident for those skilled in the art that various changes and modifications may be made without departing the spirit of the present invention. It should be understood that the scope of the invention is in no way limited by the embodiments described above, but defined by the appended claims in compliance with the inventive concept which can be grasped by the foregoing description.

What is claimed is:

1. An operating system for pressurized oil apparatus comprising at least two pressurized oil accumulators each serving as a pressurized oil source of separate pressurized oil systems, a pump for supplying pressurized oil to these pressurized oil accumulators, pressurized oil conduits for connecting said pressurized oil accumulators with said pump and having a supply valve at an inlet of each pressurized oil accumulator, an oil reservoir containing oil for supply to said pump, an unloader for distributing pressurized oil from said pump to two conduits, one serving to supply said pressurized oil from the pump to said pressurized oil conduits and the other supplying to said oil reservoir, pairs of first and second conduits each pair drawing pressurized oil from one of the pressurized oil accumulators, control valves each receiving pressurized oil for actuating a valve member thereof from said first conduit of each pair, said valve member acting to open or close said second conduit of each pair, distributing valves each receiving pressurized oil for actuating a valve member thereof from said second conduit through said control valve to thereby control pressurized oil flow to a servomotor for operating said unloader and to control a pressurized oil passage to an operating cylinder of each of said supply valves, and a pressurized oil servomotor system for actuating said unloader which is controlled by said distributing valve associated with each pressurized oil accumulator.

2. In an operating system for pressurized oil apparatus which includes at least two pressurized oil accumulators each serving as a pressurized oil source of separate pressurized oil systems, two pumps consisting of a preceding pump and a succeeding pump for supplying pressurized oil to these pressurized oil accumulators, pressurized oil conduits for connecting said pressurized oil accumulators with discharge ports of said pumps and having a supply valve at an inlet of each pressurized oil accumulator, an oil reservoir containing oil for supply to said pumps, and two unloaders one for each of the pumps for distributing pressurized oil from each of said pumps to two conduits, one serving to supply said pressurized oil from the pump to said pressurized oil conduits and the other supplying to the oil reservoir; said operating system for pressurized oil apparatus comprising a pressurized oil system for each pressurized oil accumulator consisting of a first and a second conduit provided for each pressurized oil accumulator for drawing pressurized oil therefrom, two control valves provided for each pressurized oil accumulator and receiving pressurized oil for actuating valve members thereof from said first conduit, said valve members acting to open or close said second conduit, and two distributing valves adapted to be controlled by said second conduit by receiving pressurized oil for actuating valve members thereof from said second conduit through said control valves to thereby control pressurized oil flow to a servomotor for operating each of said two unloaders and to control a pressurized oil passage to an operating cylinder of each of said supply valves, said two distributing valves one for each accumulator being so disposed that each valve is associated with a pressurized oil servomotor system for actuating each of said unloaders, and each of said unloaders being adapted to be associated with any one of said pressurized oil systems by suitably changing over change-over valves.

3. An operating system for pressurized oil apparatus according to claim 2 wherein each control valve is provided with a spring means which is disposed to oppose an actuating force exerted by pressurized oil in said first conduit, said spring means having an adjustable seat position.

References Cited in the file of this patent
UNITED STATES PATENTS

| | | |
|---|---|---|
| 2,316,445 | Marshall | Apr. 13, 1943 |
| 3,006,356 | Alfieri | Oct. 31, 1961 |